United States Patent
Lim (10) Patent No.: US 10,135,249 B2
(45) Date of Patent: Nov. 20, 2018

(54) ELECTRICITY PROVIDING SYSTEM INCLUDING ENERGY STORAGE SYSTEM

(71) Applicant: LSIS CO., LTD., Gyeonggi-do (KR)

(72) Inventor: Jae-Hwan Lim, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 239 days.

(21) Appl. No.: 15/221,202

(22) Filed: Jul. 27, 2016

(65) Prior Publication Data

US 2017/0033561 A1 Feb. 2, 2017

(30) Foreign Application Priority Data

Jul. 28, 2015 (KR) ............... 10-2015-0106907

(51) Int. Cl.
*H02J 3/32* (2006.01)
*H02J 3/38* (2006.01)
*H02J 7/00* (2006.01)

(52) U.S. Cl.
CPC ........... *H02J 3/32* (2013.01); *H02J 3/382* (2013.01); *H02J 7/0068* (2013.01); *Y02E 40/72* (2013.01); *Y02E 60/722* (2013.01); *Y04S 10/12* (2013.01); *Y04S 10/123* (2013.01); *Y04S 10/14* (2013.01)

(58) Field of Classification Search
CPC ............. H02J 3/32; H02J 3/382; H02J 7/0068
USPC ................................. 307/18, 20, 22
See application file for complete search history.

(56) References Cited

U.S. PATENT DOCUMENTS

| 2014/0077768 A1 | 3/2014 | Jung |
| 2015/0160676 A1* | 6/2015 | Pan ............ G05F 1/67 307/82 |

FOREIGN PATENT DOCUMENTS

| JP | 2008-182836 A | 8/2008 |
| JP | 2012-120284 A | 6/2012 |
| JP | 2014-161204 A | 9/2014 |
| JP | 2014-235442 A | 12/2014 |
| KR | 10-2014-0086080 A | 1/2016 |

OTHER PUBLICATIONS

Japanese Office Action dated May 30, 2017 in connection with the corresponding Japanese Patent Application.
Japanese Decision of Refusal dated Sep. 19, 2017 in connection with the corresponding Japanese Patent Application.

* cited by examiner

*Primary Examiner* — John W Poos
(74) *Attorney, Agent, or Firm* — K&L Gates LLP (57) ABSTRACT

Disclosed embodiments relate to power supply systems for supplying power. In some embodiments, a power supply system includes: a plurality of power conversion systems configured to receive and convert DC power from a power generator which generates power or an energy storage system which discharges stored energy; and a system controller configured to transmit a control instruction to control the plurality of power conversion systems based on a transmission protocol depending on an attribute of the control instruction.

9 Claims, 8 Drawing Sheets

| Type | Function |
|---|---|
| First control instruction | Set at least one of a DC/AC converter setting value included in the power conversion systems and a rising slope of output power of the plurality of power conversion systems at the beginning of charging. |
| Second control instruction | Check at least one of the internal temperature of the plurality of power conversion systems, the external temperature of the plurality of power conversion systems, the total uptime of the plurality of power conversion systems, the total running number of the plurality of power conversion systems, the rated capacity of the plurality of power conversion systems and a fault signal indicating whether or not an abnormality occurs in the plurality of power conversion systems |

ELECTRICITY PROVIDING SYSTEM INCLUDING ENERGY STORAGE SYSTEM

CROSS REFERENCE TO RELATED APPLICATIONS

This application claims the benefit of Korean Patent Application No. 10-2015-0106907, filed on Jul. 28, 2015 and entitled "ELECTRICITY PROVIDING SYSTEM INCLUDING ENERGY STORAGE SYSTEM", which is hereby incorporated by reference in its entirety.

BACKGROUND

Technical Field

The present disclosure relates to a power supply system including a battery energy storage system.

Description of the Related Art

Electric energy is in wide use because of its easy transformation and transmission. An energy storage system is used to use the electric energy with high efficiency. The energy storage system is charged with electric power. In addition, as necessary, the energy storage system is discharged to supply the stored power. This facilitates flexible supply of power.

Specifically, when a power generation system includes a battery energy storage system, an operation is performed as follows. If a load or a grid is a heavy load, the energy storage system discharges electric energy. If a load or a grid is a light load, the energy storage system is charged with power supplied from a power generator or a grid.

If the energy storage system exists independent of the power generation system, the energy storage system is charged with idle power supplied from an external power source. If a grid or a load is a heavy load, the energy storage system supplies power by discharging the stored power.

A power supply system may include a plurality of power conversion systems for duplexing and maximization of power conversion efficiency. In this case, a system controller has to control the plurality of power conversion systems with high efficiency. In particular, the system controller has to be able to transmit a control instruction to the plurality of power conversion systems with high efficiency.

SUMMARY

It is an aspect of some embodiments of the present disclosure to provide a power supply system which is capable of being operated with high stability and efficiency by controlling a plurality of power conversion systems with high efficiency. In particular, some embodiments of the present disclosure aim to provide a power supply system which is capable of transmitting a control instruction to a plurality of power conversion systems with high efficiency.

In accordance with one aspect of some embodiments of the present disclosure, there is provided a power supply system for supplying power, including: a plurality of power conversion systems configured to receive and convert DC (direct current) power from a power generator which generates power or an energy storage system which discharges stored energy; and a system controller configured to transmit a control instruction to control the plurality of power conversion systems based on a transmission protocol depending on an attribute of the control instruction.

In some embodiments, if the control instruction is a first control instruction to set the operation of the plurality of power conversion systems, the system controller may transmit the control instruction to the plurality of power conversion systems simultaneously.

In some embodiments, the first control instruction may be to set at least one of a DC/AC (direct current/alternating current) converter setting value included in the power conversion systems and a rising slope of output power of the plurality of power conversion systems at the beginning of charging.

In some embodiments, the system controller may transmit the control instruction based on UDP (User Datagram Protocol).

In some embodiments, if the control instruction is a second control instruction to check the state of the plurality of power conversion systems, the system controller may transmit the control instruction to the plurality of power conversion systems sequentially.

In some embodiments, the second control instruction may be to check at least one of the internal temperature of the plurality of power conversion systems, the external temperature of the plurality of power conversion systems, the total uptime of the plurality of power conversion systems, the total running number of the plurality of power conversion systems, the rated capacity of the plurality of power conversion systems and a fault signal indicating whether or not an abnormality occurs in the plurality of power conversion systems.

In some embodiments, the system controller may transmit the control instruction based on TCP (Transmission Control Protocol).

In some embodiments, the control instruction may comprise a time at which the control instruction is to be executed.

According to some embodiments of the present disclosure, it is possible to provide a power supply system which is capable of being operated with high stability and efficiency by controlling a plurality of power conversion systems with high efficiency. In particular, according to some embodiments of the present disclosure, it is possible to provide a power supply system which is capable of transmitting a control instruction to a plurality of power conversion systems with high efficiency.

DETAILED DESCRIPTION

Hereinafter, some embodiments of the present disclosure will be described in detail with reference to the accompanying drawings so that those skilled in the art can easily practice some embodiments of the present disclosure. It should be understood that the present disclosure is not limited to the following embodiments but may be implemented in different ways. In the following detailed description of the present disclosure, concrete description on related functions or constructions will be omitted if it is deemed that the functions and/or constructions may unnecessarily obscure the gist of the present disclosure. Throughout the specification, the same or similar elements and portions are denoted by the same or similar reference numerals.

In the specification, when a part "includes" one element, this means that the part may further include other elements rather than excluding the other elements, unless stated otherwise.

A power supply system according to some embodiments of the present disclosure will now be described in detail with reference to FIGS. 1 to 4.

Figure 1:
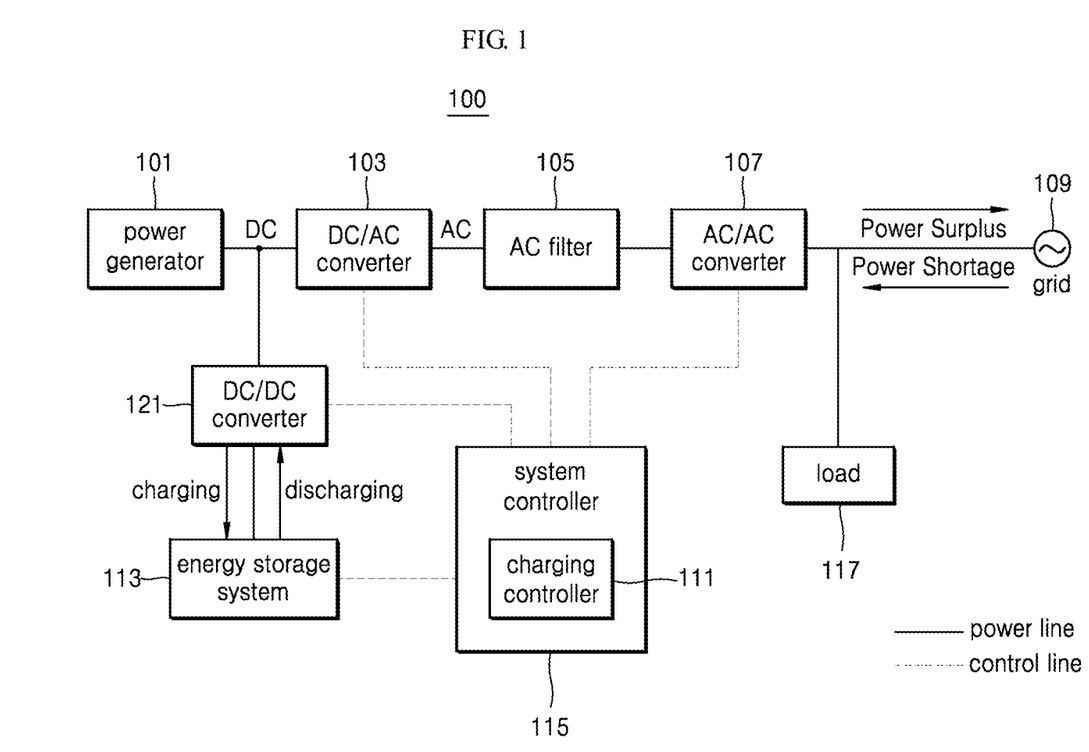
FIG. 1 is a block diagram of a power supply system according to some embodiments of the present disclosure.

FIG. 1 is a block diagram of a power supply system according to some embodiments of the present disclosure.

Referring to FIG. 1, a power supply system 100 includes a power generator 101, a DC/AC converter 103, an AC filter 105, an AC/AC converter 107, a grid 109, a charging controller 111, an energy storage system 113, a system controller 115, a load 117 and a DC/DC converter 121.

The power generator 101 produces electric energy. In some embodiments, the power generator 101 may be a solar power system including a solar cell array consisting of a plurality of solar cell modules, each of which includes a plurality of solar cells connected in series or in parallel so as to absorb solar energy and convert it into electric energy to produce a predetermined voltage and current. In some embodiments, the power generator 101 may be a wind power system including a fan to convert wind energy into electric energy. However, as described previously, the power supply system 100 may supply power through only the energy storage system 113 without the power generator 101. In this case, the power supply system 100 may exclude the power generator 101.

The DC/AC converter 103 converts DC power, which is received from the power generator 101 or the energy storage system 113, into AC power.

The AC filter 105 filters out a noise of the AC power output from the DC/AC converter 103. Depending on embodiments, the AC filter 105 may be omitted.

The AC/AC converter 107 adjusts a voltage of the noise-filtered AC power to a voltage suitable to be supplied to the grid 109 or the independent load 117. Depending on embodiments, the AC/AC converter 107 may be omitted.

The grid 109 is a system which includes a power station, power substations, transmission/distribution lines and loads and generates and uses power.

The load 117 receives and consumes the electric energy (power) from the power generator 101. The energy storage system 113 is charged with the electric energy supplied from the power generator 101 and is discharged with the stored electric energy according to power supply and demand conditions of the grid 109 or the load 117. Specifically, if the grid 109 or the load 117 is a light load, the energy storage system 113 is charged with idle power supplied from the power generator 101. If the grid 109 or the load 117 is a heavy load, the energy storage system 113 is discharged with the stored power to supply power to the grid 109 or the load 117. The power supply and demand conditions of the grid 109 or the load 117 may be greatly different for different time zones. Accordingly, it is inefficient for the power supply system 100 to supply the power, which is supplied by the power generator 101, to the grid 109 or the load 117 with no consideration of the power supply and demand conditions of the grid 109 or the load 117. Therefore, the power supply system 100 uses the energy storage system 113 to adjust the amount of supply of power according to the power supply and demand conditions of the grid 109 or the load 117. This allows the power supply system 100 to supply power to the grid 109 or the load 117 with high efficiency.

The DC/DC converter 121 adjusts the magnitude of DC power supplied by the energy storage system 113 or DC power to be supplied to the energy storage system 113. Depending on embodiments, the DC/DC converter 121 may be omitted.

The system controller 115 controls the operation of the DC/AC converter 103 and AC/AC converter 107. The system controller 115 may include a charging controller 111 which controls charging/discharging of the energy storage system 113. The charging controller 111 controls the charging/discharging of the energy storage system 113. If the grid 109 or the load 117 is a heavy load, the charging controller 111 controls the energy storage system 113 to supply power to the grid 109 or the load 117. If the grid 109 or the load 117 is a light load, the charging controller 111 controls an external power source or the power generator 101 to supply power to the energy storage system 113.

Figure 2:
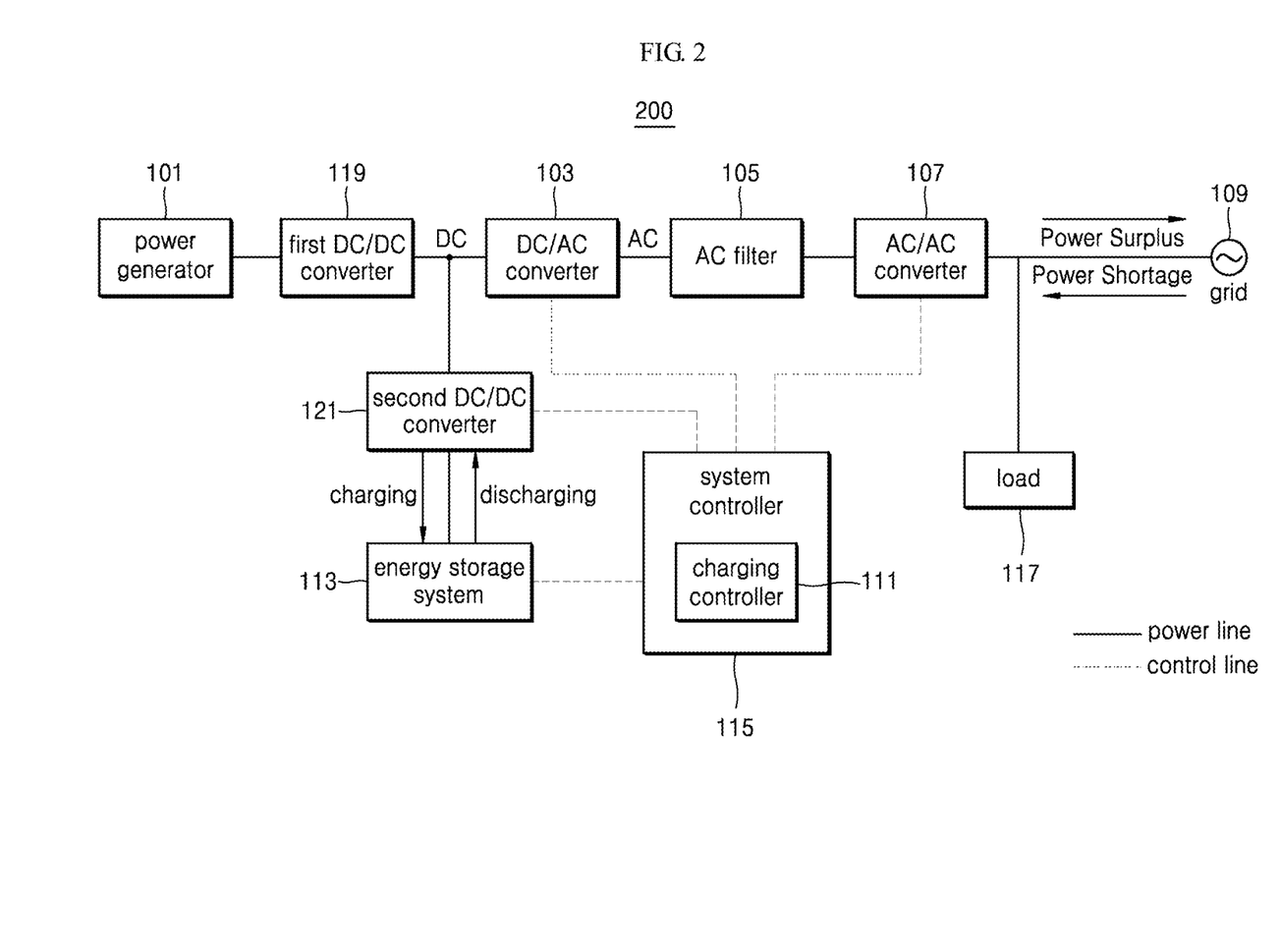
FIG. 2 is a block diagram of a small-capacity power supply system according to some embodiments of the present disclosure.

FIG. 2 is a block diagram of a small-capacity power supply system according to some embodiments of the present disclosure.

Referring to FIG. 2, a small-capacity power supply system 200 includes a power generator 101, a DC/AC converter 103, an AC filter 105, an AC/AC converter 107, a grid 109, a charging controller 111, an energy storage system 113, a system controller 115, a first DC/DC converter 119, a load 117 and a second DC/DC converter 121.

Some embodiments of FIG. 2 include the same configuration as that of FIG. 1 except that the former further includes the first DC/DC converter 119. The first DC/DC converter 119 adjusts a voltage of DC power generated by the power generator 101. In the small-capacity power supply system 200, the power generator 101 produces power of a small voltage. Therefore, the small voltage of the power produced by the power generator 101 may be boosted before the power is input to the DC/AC converter 103. The first DC/DC converter 119 adjusts the voltage of the power produced by the power generator 101 to a voltage suitable to be input to the DC/AC converter 103.

Figure 3:
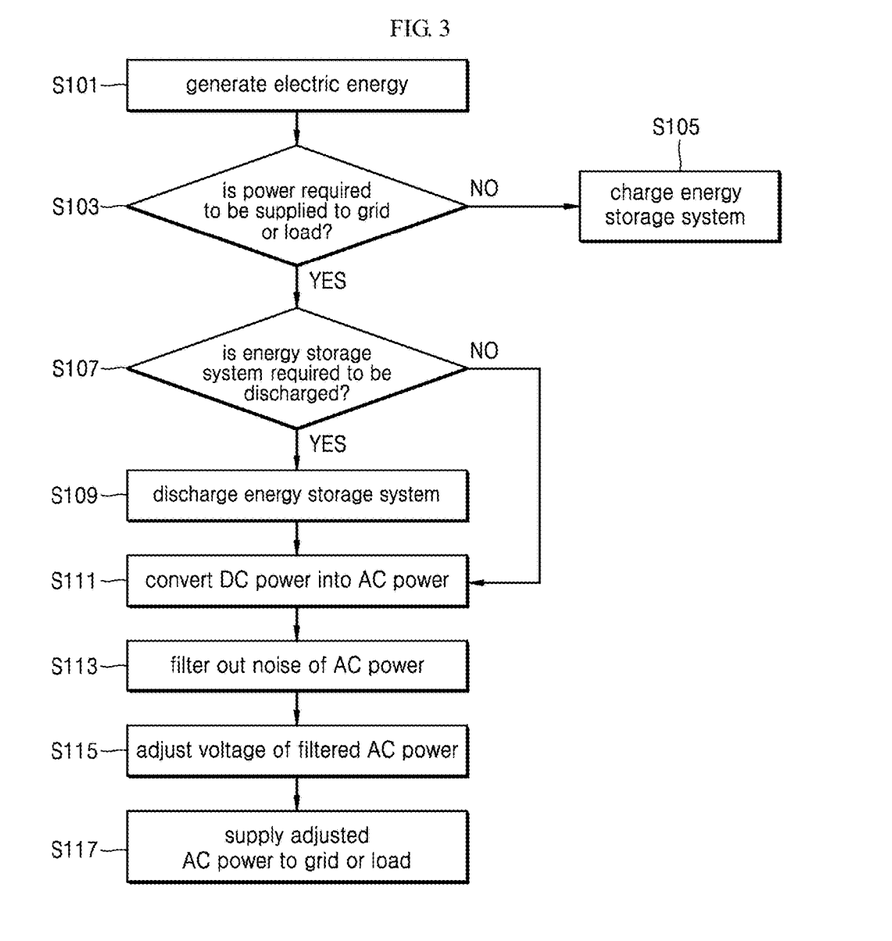
FIG. 3 is a flow chart showing an operation of a power supply system including a power generator according to some embodiments of the present disclosure.

FIG. 3 is a flow chart showing an operation of a power supply system including a power generator according to some embodiments of the present disclosure.

The power generator 101 produces electric energy (S101). In some embodiments, if the power generator 101 is a solar power system, the power generator 101 converts solar energy into electric energy. In some embodiments, if the power generator 101 is a wind power system, the power generator 101 converts wind energy into electric energy.

The charging controller 111 determines whether or not power is required to be supplied to the grid 109 or the load 117 (S103). The determination on whether or not power is required to be supplied to the grid 109 or the load 117 may be made based on a determination on whether the grid 109 or the load 117 is a heavy load or a light load.

If power is required to be supplied to the grid 109 or the load 117, the charging controller 111 charges the energy storage system 113 (S105).

The charging controller 111 determines whether or not the energy storage system 113 is required to be discharged (S107). If a power demand of the grid 109 or the load 117 is not met only with electric energy supplied by the power generator 101, the charging controller 111 may determine that the energy storage system 113 is required to be discharged. In addition, the charging controller 111 may determine whether or not the energy storage system 113 stores electric energy enough to be discharged.

If the energy storage system 113 is required to be discharged, the charging controller 111 discharges the energy storage system 113 (S109).

The DC/AC converter 103 converts the electric energy with which the energy storage system 113 is discharged and the electric energy produced by the power generator 101 into AC power (S111). At this time, the power supply system 100 uses one DC/AC converter 103 to convert both of the electric energy with which the energy storage system 113 is discharged and the electric energy produced by the power generator 101 from DC power to AC power. An electric device includes a limit in usable power, which may include an instantaneous limit and a long time limit. Rated power is defined as the maximum power with which the electric device can be reasonably used without being impaired. In order to maximize the efficiency of the DC/AC converter 103, the energy storage system 113 and the power generator 101 may supply 70% to 90% of the rated power to the DC/AC converter 103.

The AC filter 105 filters out a noise of the AC power obtained in the DC/AC converter 103 (S113). As described earlier, depending on embodiments, the noise filtering operation of the AC filter 105 may be omitted.

The AC/AC converter 107 adjusts a voltage of the filtered AC power to a voltage suitable to be input to the grid 109 or the load 117 (S115). As described earlier, depending on embodiments, the adjusting operation of the AC/AC converter 107 may be omitted.

The power supply system 100 supplies the adjusted AC power to the grid 109 or the load 117 (S117).

Figure 4:
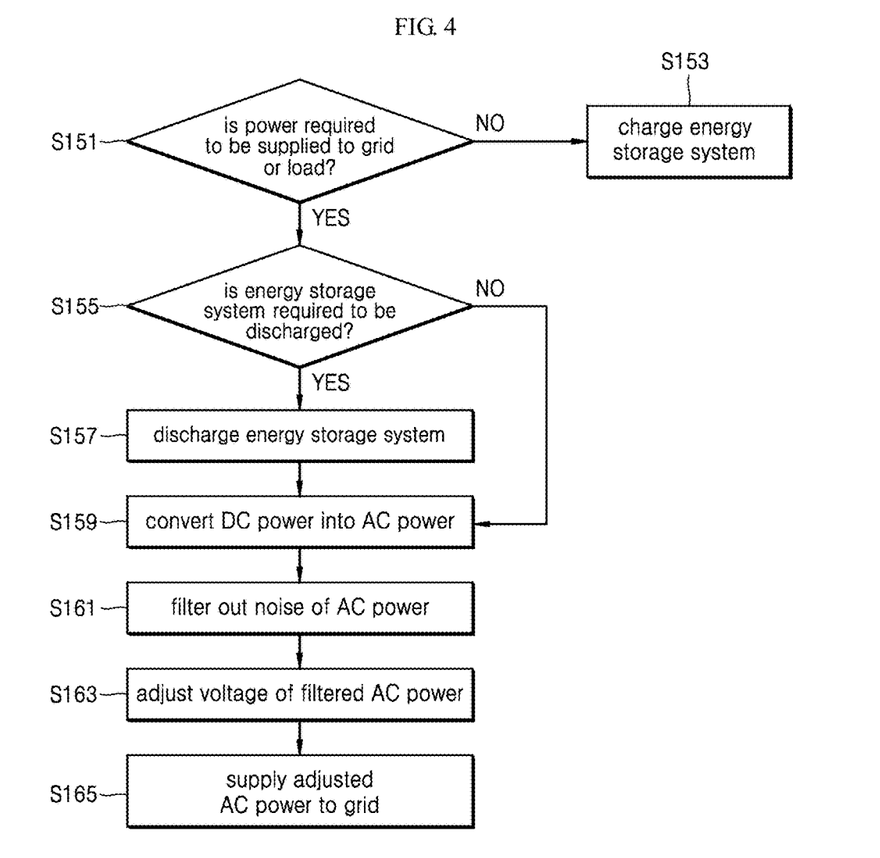
FIG. 4 is a flow chart showing an operation of a power supply system including no power generator according to some embodiments of the present disclosure.

FIG. 4 is a flow chart showing an operation of a power supply system including no power generator according to some embodiments of the present disclosure.

The charging controller 111 determines whether or not power is required to be supplied to the grid 109 or the load 117 (S151). The determination on whether or not power is required to be supplied to the grid 109 or the load 117 may be made based on a determination on whether the grid 109 or the load 117 is a heavy load or a light load.

If power is required to be supplied to the grid 109 or the load 117, the charging controller 111 controls the energy storage system 113 to be charged with power supplied from an external power source (S153).

The charging controller 111 determines whether or not the energy storage system 113 is required to be discharged (S155). In addition, the charging controller 111 may determine whether or not the energy storage system 113 stores electric energy enough to be discharged.

If the energy storage system 113 is required to be discharged, the charging controller 111 controls the energy storage system 113 to be discharged (S157).

The DC/AC converter 103 converts the electric energy with which the energy storage system 113 is discharged and the electric energy produced by the power generator 101 from DC power into AC power (S159).

The AC filter 105 filters out a noise of the AC power obtained in the DC/AC converter 103 (S161). As described earlier, depending on embodiments, the noise filtering operation of the AC filter 105 may be omitted.

The AC/AC converter 107 adjusts a voltage of the filtered AC power to a voltage suitable to be input to the grid 109 or the load 117 (S163). As described earlier, depending on embodiments, the adjusting operation of the AC/AC converter 107 may be omitted.

The power supply system 100 supplies the adjusted AC power to the grid 109 or the load 117 (S165).

In the power supply system 100, devices acting to supply power produced by the power generator 101 to the load 117 or the grid 109, such as the DC/AC converter 103, the AC filter 105 and the AC/AC converter 107, may be collectively referred to as a power conversion system (PCS). The power conversion system plays a key role of converting or adjusting and supplying the power produced in the power supply system 100. Since the power conversion system includes a limited lifespan, an operator or a manager may replace the power conversion system with a new one in due course. However, in many cases, the power supply system 100 may be located remotely from residential areas, which may result in difficulty in taking prompt measures against any possible problems of the power conversion system. Therefore, there is a need for the power supply system 100 to include a plurality of power conversion systems in preparation for abnormality of any power conversion system. In addition, the power conversion system includes a size of power conversion to exhibit the maximum power conversion efficiency depending on a rated capacity. Therefore, when the power supply system 100 selectively operates the plurality of power conversion systems according to the size of power conversion, it is possible to maximize the power conversion efficiency. However, there is a need for the power supply system 100 to transmit a control instruction to the plurality of power conversion systems with efficiency, as will be described in detail below with reference to the drawings.

Figure 5:
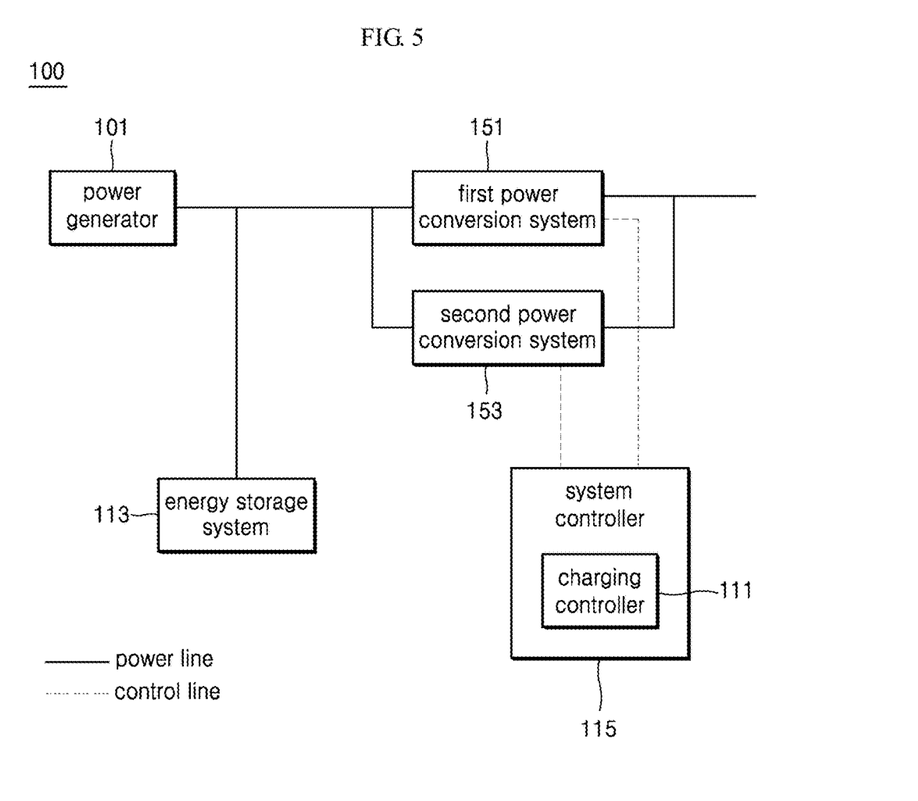
FIG. 5 is a block diagram of a power supply system including a plurality of power conversion systems (PCSs) according to some embodiments of the present disclosure.

FIG. 5 is a block diagram of a power supply system including a dual power conversion system according to some embodiments of the present disclosure.

The power supply system 100 in some embodiments of FIGS. 1 and 2 includes a single power conversion system. As described previously, the power supply system 100 may include a plurality of power conversion systems for the purpose of achieving high stability and power conversion efficiency.

Referring to FIG. 5, the power supply system 100 includes a power generator 101, a charging controller 111, an energy storage system 113, a first power conversion system 151, a second power conversion system 153 and a system controller 115.

Here, the operations of the power generator 101, charging controller 111 and energy storage system 113 may be as described in some embodiments of FIGS. 1 and 2. In addition, as described previously, if the power supply system 100 is provided independent of the power generator 101, the power generator 101 may be omitted.

Each of the first power conversion system 151 and the second power conversion system 153 converts or adjusts power produced by the power generator 101 or power with which the energy storage system 113 is discharged, to power suitable to be supplied or input to the load 117 or the grid 109. In this case, each of the first power conversion system 151 and the second power conversion system 153 may include at least one of the above-described DC/AC converter 103, AC filter 105 and AC/AC converter 107.

The system controller 115 controls the operation of configurations included in the power supply system 100. The system controller 115 can transmit a control instruction to control the operation of configurations included in the power supply system 100. In some embodiments, the system controller 115 may transmit a control instruction to control a plurality of power conversion systems. Specifically, the system controller 115 may transmit the control instruction to check the state of the plurality of power conversion systems. The power conversion system state may include at least one of the internal temperature of power conversion systems, the external temperature of power conversion systems, the total uptime of power conversion systems, the total running number of power conversion systems, the rated capacity of power conversion systems and a fault signal indicating whether or not an abnormality occurs in the power conversion systems. In addition, the system controller 115 may transmit a control instruction to set the operation of a plurality of power conversion systems. Specifically, the system controller 115 may transmit the control instruction to set at least one of a DC/AC converter setting value included in the power conversion systems and a rising slope of output power at the beginning of charging. In addition, in some embodiments, the system controller 115 may transmit the control instruction to the plurality of power conversion systems based on DNP (Distributed Network Protocol). In addition, the system controller 115 may transmit the control instruction to the plurality of power conversion systems in the form of a packet based on IP (Internet Protocol). For example, the system controller 115 may transmit the control instruction to the plurality of power conversion systems in the form of an IP packet based on DNP.

The operation of the power supply system including the plurality of power conversion systems according to some embodiments of the present disclosure will be described in detail below with reference to FIG. 6.

Figure 6:
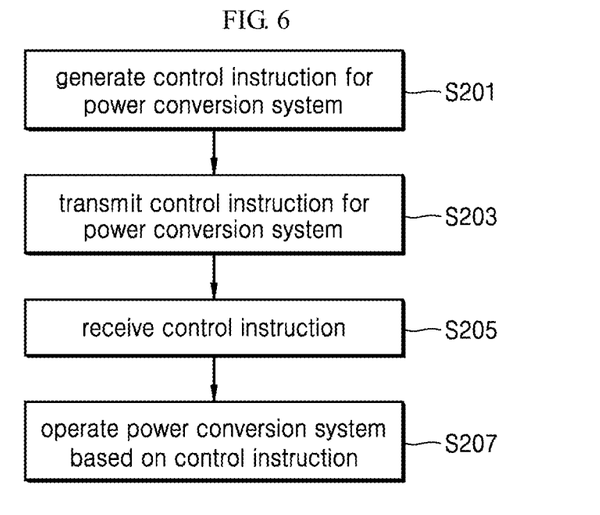
FIG. 6 is a flow chart showing an operation of the power supply system including the plurality of power conversion systems according to some embodiments of the present disclosure.

FIG. 6 is a flow chart showing the operation of the power supply system according to some embodiments of the present disclosure.

The system controller 115 generates a control instruction for power conversion system (S201). Specifically, the system controller 115 can generate a control instruction to check the state of power conversion system. In this case, the power conversion system state may include at least one of the internal temperature of power conversion system, the external temperature of power conversion system, the total uptime of power conversion system, the total running number of power conversion system, the rated capacity of power conversion system and a fault signal indicating whether or not an abnormality occurs in the power conversion system. In addition, the system controller 115 may generate a control instruction to set the operation of the power conversion system. In this case, the control instruction to set the operation of the power conversion system may set at least one of a DC/AC converter setting value included in the power conversion system and a rising slope of output power at the beginning of charging.

The system controller 115 transmits the control instruction for the power conversion system (S203). In some embodiments, the system controller 115 may transmit a power conversion system control instruction to a plurality of power conversion systems. Specifically, the system controller 115 may sequentially transmit the control instruction to the plurality of power conversion systems. Specifically, the system controller 115 may sequentially transmit the control instruction to the plurality of power conversion systems based on TCP (Transmission Control Protocol). In some embodiments, the system controller 115 may use TCP based on DNP. For example, the system controller 115 may transmit the control instruction in the form of a TCP-based IP packet to the plurality of power conversion systems based on DNP.

The power conversion system receives the control instruction (S205). Specifically, the power conversion system can receive the control instruction from the system controller 115. In some embodiments, the power conversion system may receive the control instruction from the system controller 115 based on TCP. For example, the power conversion system may receive an IP packet from the system controller 115 based on TCP and extract a control instruction from the IP packet.

The power conversion system is operated based on the control instruction (S207). Specifically, if the control instruction is to check the state of power conversion system, the power conversion system can transmit the state of power conversion system to the system controller 115. In some embodiments, the power conversion system may check the state of power conversion system and transmit the state of power conversion system to the system controller 115. In this case, as described previously, the power conversion system state may include at least one of the internal temperature of power conversion system, the external temperature of power conversion system, the total uptime of power conversion system, the total running number of power conversion system, the rated capacity of power conversion system and a fault signal indicating whether or not an abnormality occurs in the power conversion system. In addition, the power conversion system can set the operation of the power conversion system according to the control instruction. In this case, the control instruction to set the operation of the power conversion system may set at least one of a DC/AC converter setting value included in the power conversion system and a rising slope of output power at the beginning of charging. For example, the power conversion system can set a DC/AC converter according to the control instruction.

As described previously, when the system controller 115 sequentially transmits the control instruction for power conversion system to the plurality of power conversion systems, the plurality of power conversion systems cannot receive the control instruction at the same point of time. Therefore, the plurality of power conversion systems starts their respective operations for the control instruction at different points of time. This may cause a circulating current which may cause a failure of power conversion system in operation of the power conversion systems. In addition, this may reduce the efficiency of the power conversion system operation. Therefore, there is a need of a control instruction transmission method to avoid these problems, as will be described below with reference to the drawings.

Figure 7:
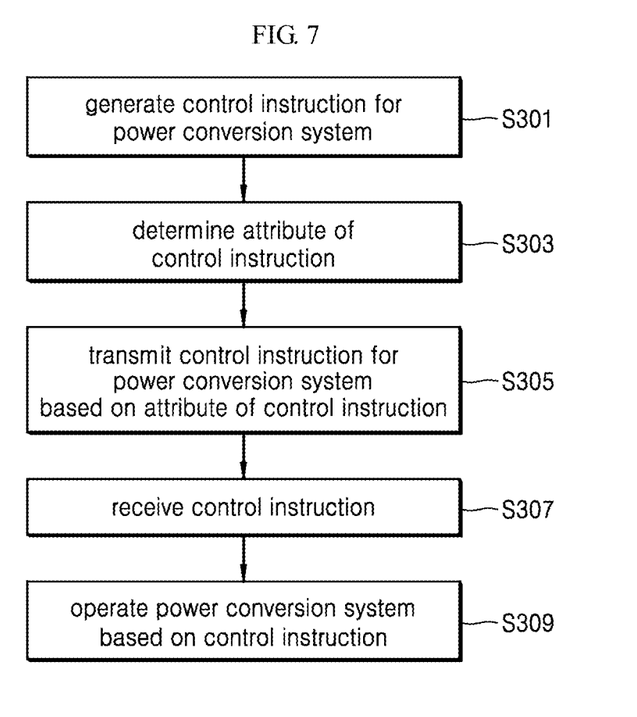
FIG. 7 is a flow chart showing an operation of a power supply system including a plurality of power conversion systems according to some embodiments of the present disclosure.

FIG. 7 is a flow chart showing an operation of a power supply system including a plurality of power conversion systems according to some embodiments of the present disclosure.

The system controller 115 generates a control instruction for power conversion system (S301). Specifically, as described previously, the system controller 115 can generate a control instruction to check the state of power conversion system. In this case, the power conversion system state may include at least one of the internal temperature of power conversion system, the external temperature of power conversion system, the total uptime of power conversion system, the total running number of power conversion system, the rated capacity of power conversion system and a fault signal indicating whether or not an abnormality occurs in the power conversion system. In addition, the system controller 115 may generate a control instruction to set the operation of the power conversion system. In this case, the control instruction to set the operation of the power conversion system may set at least one of a DC/AC converter setting value included in the power conversion system and a rising slope of output power at the beginning of charging.

The system controller 115 determines an attribute of the control instruction (S303), as will be described below with reference to FIG. 8.

Figure 8:
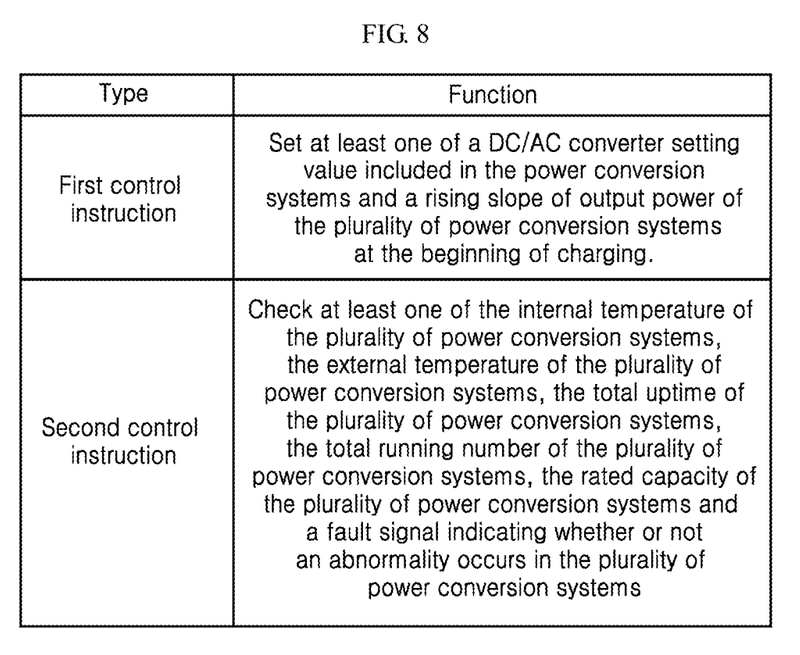
FIG. 8 shows a classification of control instruction according to some embodiments of the present disclosure.

FIG. 8 shows a classification of control instruction according to some embodiments of the present disclosure.

The system controller 115 can check whether the control instruction is a first control instruction for setting the operation of power conversion system or a second control instruction for checking the state of power conversion system. The first control instruction may be to set at least one of a DC/AC converter setting value included in the power conversion system and a rising slope of output power at the beginning of charging. The second control instruction may be to check at least one of the internal temperature of power conversion system, the external temperature of power conversion system, the total uptime of power conversion system, the total running number of power conversion system, the rated capacity of power conversion system and a fault signal indicating whether or not an abnormality occurs in the power conversion system, as described previously.

Returning to FIG. 7 to explain the operation of the power supply system 100, the system controller 115 transmits the control instruction for power conversion system based on the attribution of the control instruction (S305). In some embodiments, the system controller 115 may transmit the control instruction to a plurality of power conversion systems simultaneously based on the attribution of the control instruction. Specifically, if the control instruction corresponds to the first control instruction to set the operation of power conversion system, the system controller 115 can transmit the control instruction to the plurality of power conversion systems simultaneously. More specifically, if the control instruction corresponds to the first control instruction to set the operation of power conversion system, the system controller 115 can multicast the control instruction to the plurality of power conversion systems based on UDP (User Datagram Protocol). As described previously, this is because an abnormality may occur in the power supply system 100 when the plurality of power conversion systems is sequentially operated. If the control instruction corresponds to the second control instruction to check the state of power conversion system, the system controller 115 can transmit the control instruction to the plurality of power conversion systems sequentially. Specifically, if the control instruction corresponds to the second control instruction to check the state of power conversion system, the system controller 115 can unicast the control instruction to the plurality of power conversion systems based on TCP. This is because no abnormality occurs in the power supply system 100 even if the state of power conversion system is not simultaneously checked in the plurality of power conversion systems. In addition, as described previously, the control instruction of the system controller 115 may be based on DNP.

The power conversion system receives the control instruction (S307). Specifically, the power conversion system can receive the control instruction from the system controller 115. In some embodiments, the power conversion system may receive the first control instruction from the system controller 115 based on UDP. In some embodiments, the power conversion system may receive the second control instruction from the system controller 115 based on TCP. For example, the power conversion system can receive an IP packet from the system controller 115 based on TCP and extract the second control instruction from the IP packet.

When the first control instruction and the second control instruction are transmitted to the power conversion system, it is preferable that the first control instruction is first transmitted and the second control instruction is next transmitted. That is, the first control instruction may be arranged at a head and the second control instruction may be arranged thereafter in the system controller 115 according to a control instruction arrangement order based on TCP.

Accordingly, the first control instruction can be transmitted to the power conversion system in preference to the second control instruction.

The power conversion system is operated based on the control instruction (S309). Specifically, if the control instruction is the first control instruction, the power conversion system can set the operation of power conversion system according to the control instruction. In this case, the control instruction to set the operation of power conversion system may set at least one of a DC/AC converter setting value included in the power conversion system and a rising slope of output power at the beginning of charging. For example, the power conversion system can set a DC/AC converter according to the control instruction. If the control instruction is the second control instruction, the power conversion system can transmit the state of power conversion system to the system controller 115. In some embodiments, the power conversion system may check the state of power conversion system and transmit the state of power conversion system to the system controller 115. In this case, as described previously, the power conversion system state may include at least one of the internal temperature of power conversion system, the external temperature of power conversion system, the total uptime of power conversion system, the total running number of power conversion system, the rated capacity of power conversion system and a fault signal indicating whether or not an abnormality occurs in the power conversion system.

Through this operation, the plurality of power conversion systems can be simultaneously operated according to the control instruction of the system controller 115. Accordingly, it is possible to increase the efficiency of the power supply system and prevent an abnormal operation from occurring.

In some embodiments, the system controller 115 may generate a control instruction in which a time at which the control instruction is to be executed is inserted. In this case, the power conversion system can extract the control instruction execution time from the control instruction and execute the control instruction at the corresponding time. This allows the plurality of power conversion systems to be simultaneously operated. However, some embodiments may include a problem of increase in data size of the control instruction and decrease in execution speed of the control instruction. However, some embodiments include an advantage in that the existing control instruction transmission protocol can be used as it is.

In some embodiments, the system controller 115 may receive the power conversion system state from the power conversion system in response to the second control instruction and alarm an abnormality of the power conversion system in response to the received power conversion system state.

More specifically, the system controller 115 receives at least one of the internal temperature of power conversion system, the external temperature of power conversion system, the total uptime of power conversion system, the total running number of power conversion system, the rated capacity of power conversion system and a fault signal indicating whether or not an abnormality occurs in the power conversion system.

Thereafter, the system controller 115 selects a preset reference value depending on the type of information on the power conversion system state and compares the received power conversion system state with the selected reference value.

As a result of the comparison, if it is determined that an abnormality occurs in the power conversion system, the system controller 115 can inform a manager or management terminal of the power conversion system of an abnormality signal indicating the occurrence of abnormality.

The above-described features, structures, effects and so on are included in at least one of the above embodiments. Further, the features, structures, effects and so on illustrated in each embodiment can be combined or modified in various ways in other embodiments and can be practiced by those skilled in the art. Therefore, such combinations and modifications should be construed to be encompassed in the scope of the disclosure.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of some embodiments described herein may be made without departing from the spirit of the disclosures. The accompanying claims and their equivalents are intended to cover such forms or modifications as would fall within the scope and spirit of the disclosures. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A power supply system for supplying power, comprising:
a plurality of power conversion systems configured to receive and convert DC power from a power generator which generates power or an energy storage system which discharges stored energy; and
a system controller configured to transmit a control instruction used to control the plurality of power conversion systems based on a transmission protocol, wherein the transmission protocol depends on an attribute of the control instruction,
wherein the system controller is further configured to classify the control instruction into a first control instruction and a second control instruction depending on the attribute of the control instruction, and
wherein the first control instruction is transmitted to the power conversion systems in preference to the second control instruction.

2. The power supply system according to claim 1, wherein if the control instruction is used to set an operation of the plurality of power conversion systems, the system controller is further configured to transmit the control instruction to the plurality of power conversion systems simultaneously.

3. The power supply system according to claim 1, wherein the first control instruction is used to set at least one of a DC/AC converter setting value included in the power conversion systems or a rising slope of output power of the plurality of power conversion systems at the beginning of charging.

4. The power supply system according to claim 2, wherein the system controller is further configured to transmit the control instruction based on User Datagram Protocol.

5. The power supply system according to claim 1, wherein, if the control instruction is used to check a state of the plurality of power conversion systems, the system controller is further configured to transmit the control instruction to the plurality of power conversion systems sequentially.

6. The power supply system according to claim 5, wherein the control instruction is used to check at least one of: an internal temperature of the plurality of power conversion systems, an external temperature of the plurality of power conversion systems, a total uptime of the plurality of power conversion systems, a total number of the plurality of power conversion systems, a rated capacity of the plurality of power conversion systems, or a fault signal indicating whether or not an abnormality occurs in the plurality of power conversion systems.

7. The power supply system according to claim 5, wherein the system controller is further configured to transmit the control instruction based on TCP.

8. The power supply system according to claim 1, wherein the control instruction comprises a time at which the control instruction is to be executed.

9. The power supply system according to claim 1, wherein the first control instruction is a control instruction used to set the operation of the power conversion systems, and
wherein the second control instruction is a control instruction used to check a state of the power conversion systems.

* * * * *